(12) United States Patent
Suzuki et al.

(10) Patent No.: US 11,733,810 B2
(45) Date of Patent: Aug. 22, 2023

(54) TOUCH DISPLAY DEVICE

(71) Applicant: LG DISPLAY CO., LTD., Seoul (KR)

(72) Inventors: Takayuki Suzuki, Tokyo (JP);
Tomonori Miyokawa, Tokyo (JP);
Tsutomu Ichikawa, Tokyo (JP);
Jae-Hun Ye, Paju-si (KR); Shinji Takasugi, Tokyo (JP)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/495,422

(22) Filed: Oct. 6, 2021

(65) Prior Publication Data
US 2022/0113821 A1 Apr. 14, 2022

(30) Foreign Application Priority Data

Oct. 13, 2020 (JP) .................... 2020-172731

(51) Int. Cl.
*G06F 3/041* (2006.01)
*G06F 3/044* (2006.01)

(52) U.S. Cl.
CPC ............ *G06F 3/044* (2013.01); *G06F 3/0412* (2013.01)

(58) Field of Classification Search
CPC ................. G06F 3/0412; G06F 3/044
See application file for complete search history.

(56) References Cited

U.S. PATENT DOCUMENTS

| | | | |
|---|---|---|---|
| 9,423,916 B2 | 8/2016 | Wang et al. | |
| 2014/0096616 A1* | 4/2014 | Jeon | G01L 1/005 438/34 |
| 2015/0022488 A1* | 1/2015 | Xi | G06F 3/046 345/174 |
| 2015/0355758 A1* | 12/2015 | Zhang | G06F 3/0416 345/174 |
| 2016/0188083 A1* | 6/2016 | Shi | G06F 3/0446 345/174 |
| 2018/0059461 A1* | 3/2018 | Katsuta | G06F 3/04164 |
| 2018/0081470 A1* | 3/2018 | Li | G06F 3/0443 |
| 2018/0164920 A1* | 6/2018 | Wang | G06F 3/046 |
| 2018/0173359 A1* | 6/2018 | Ji | G06F 3/04166 |
| 2018/0350885 A1* | 12/2018 | Choi | H01L 51/5206 |
| 2019/0012017 A1* | 1/2019 | Kurasawa | G09G 3/3696 |
| 2022/0113823 A1* | 4/2022 | Hu | G06F 3/0412 |

FOREIGN PATENT DOCUMENTS

KR 10-2020-0052261 A 5/2020

OTHER PUBLICATIONS

Korean Office Action dated Aug. 11, 2022 issued in Patent Application No. 10-2021-0132508 (4 pages).

* cited by examiner

*Primary Examiner* — Hong Zhou
(74) *Attorney, Agent, or Firm* — Polsinelli PC

(57) ABSTRACT

A touch display device, in which a plurality of touch electrodes are arranged in a display panel, includes: the plurality of touch electrodes installed inside the display panel; a first coil installed inside the display panel and making a current flow for a mutual induction with the plurality of touch electrodes; and a second coil installed inside the display panel and on which a current flows by a mutual induction with the plurality of touch electrodes, wherein the touch display device conducts a touch detection by the current flowing the second coil.

18 Claims, 7 Drawing Sheets

FIG. 3 read-out coil | LC sensor

TOUCH DISPLAY DEVICE

CROSS-REFERENCE TO RELATED APPLICATION

The present application claims the priority benefit of Japanese Patent Application No. 2020-172731 filed on Oct. 13, 2020, which is hereby incorporated by reference in its entirety for all purposes as if fully set forth herein.

BACKGROUND

Field of the Disclosure

The present disclosure relates to a touch display device.

Description of the Background

Recently, needs for display devices displaying images have increased in various types in conjunction with a development of an information society, and various display devices have been used.

As examples of such the display devices, there are liquid crystal display devices, plasma display devices and organic light emitting display devices.

Further, as one of the display devices, there is a touch display device in which an information is input by an user's touching a display screen.

The touch display device provides an input method in which a user is able to input an information or instruction intuitively and conveniently, out of conventional input methods of a button, a keyboard, a mouse and so on.

The touch display devices are required to detect whether or not there is a user's touch and detect a touch position (touch coordinate) through various touch sensing methods.

Among various touch sensing methods, a touch sensing method is widely used which detects whether or not there is a touch and a touch position (touch coordinate) based on a change of a capacitance that is formed by a plurality of touch electrodes installed at a touch panel.

In a touch panel of the prior art touch display device, a plurality of touch electrodes are arranged closely in a complicated form. Thus, because of an entrainment of foreign substances or the like in manufacturing processes, there is concern that a short-circuit between the touch electrodes is produced.

When the short-circuit is produced, a touch sensitivity is reduced significantly and thus a touch sensing itself may not be made.

The touch display devices are categorized broadly into an external type touch display device in which a touch panel is attached to a display panel, and an internal type touch display device in which a display panel and a touch panel are integrated.

The internal type touch display devices are categorized into an in-cell type touch display device in which a touch panel function portion is embedded in a TFT (Thin Film Transistor) cell, and an on-cell type touch display device in which a touch panel function portion is added on a glass substrate, and among these touch display devices, the in-cell type touch display device is specially paid attention to.

In the in-cell type touch display device, by detecting a change of a capacitance formed in a TFT liquid crystal cell, whether or not there is a touch, a touch position (touch coordinate) and so on can be detected.

For example, a patent literature 1, U.S. Pat. No. 9,423,916, discloses a configuration of an in-cell type touch display device.

SUMMARY

Accordingly, the present disclosure is directed to a touch display device that substantially obviates one or more of the problems due to limitations and disadvantages of the background art.

More specifically, the present disclosure is to provide a touch display device which can detect whether or not there is a touch and a touch position through a new method other than the prior art.

Additional features and advantages of the disclosure will be set forth in the description which follows, and in part will be apparent from the description, or may be learned by practice of the disclosure. These and other advantages of the disclosure will be realized and attained by the structure particularly pointed out in the written description and claims hereof as well as the appended drawings.

To achieve these and other advantages and in accordance with the purpose of the present disclosure, as embodied and broadly described herein, a touch display device, in which a plurality of touch electrodes are arranged in a display panel, includes: the plurality of touch electrodes installed inside the display panel; a first coil installed inside the display panel and making a current flow for a mutual induction with the plurality of touch electrodes; and a second coil installed inside the display panel and on which a current flows by a mutual induction with the plurality of touch electrodes, wherein the touch display device conducts a touch detection by the current flowing the second coil.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this specification, illustrate aspects of the disclosure and together with the description serve to explain the principles of the disclosure.

In the drawings.

DETAILED DESCRIPTION

Reference will now be made in detail to exemplary aspects, examples of which are illustrated in the accompanying drawings. The same reference numbers may be used throughout the drawings to refer to the same or like parts.

Figure 1:
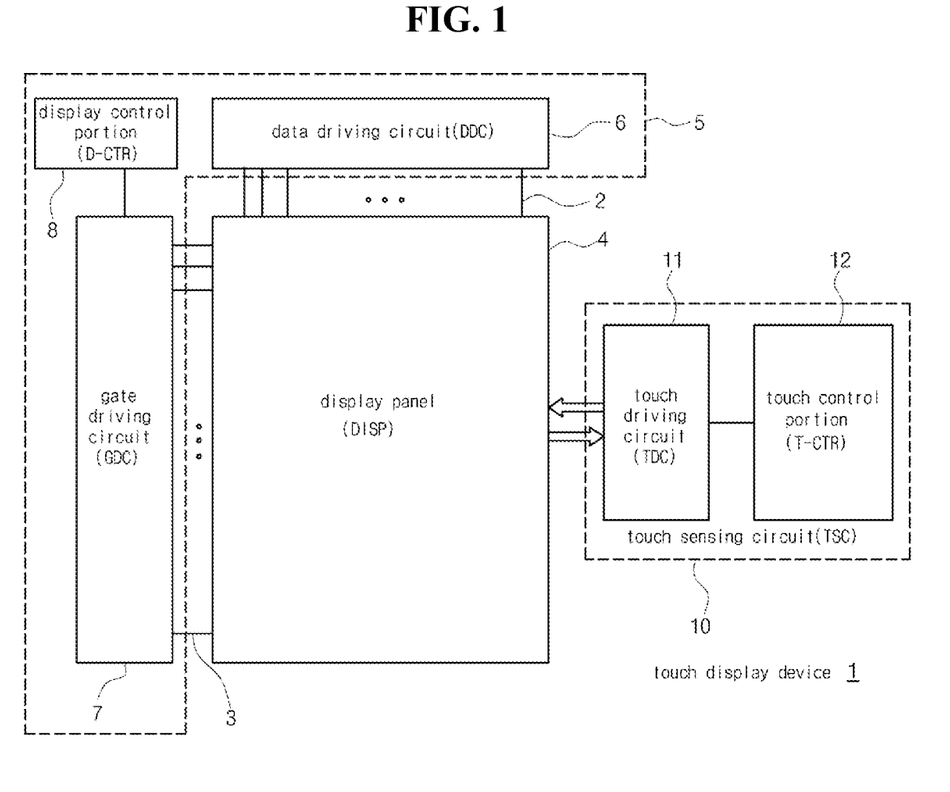
FIG. 1 is a block diagram illustrating a whole configuration of a touch display device according to an aspect of the present disclosure.

FIG. 1 is a block diagram illustrating a whole configuration of a touch display device 1 according to an aspect of the present disclosure.

Referring to FIG. 1, the touch display device 1 includes a display panel 4 (DISP) in which data lines 2 (DL) and gate lines 3 (GL) are arranged and which displays a picture, and a display driving circuit 5 driving the display panel 4.

The display driving circuit 5 includes a data driving circuit 6 (DDC) driving the data lines 2, a gate driving circuit 7 (GDC) driving gate lines 3, and a display control portion 8 (D-CTR) controlling the data driving circuit 6 and the gate driving circuit 7.

Further, the touch display device 1 shown in FIG. 1 includes a touch sensing circuit 10 (TSC) performing a touch driving and a sensing processing for a plurality of touch electrodes which are included in display elements arranged in the display panel 4.

The touch sensing circuit 10 supplies driving signals to the touch electrodes, detects sensing signals from the touch electrodes, and senses whether or not there is a touch and a touch position.

The touch sensing circuit 10 includes a touch driving circuit 11 (TDC) supplying driving signals to the touch electrodes and receiving sensing signals from the touch electrodes, and a touch control portion 12 (T-CTR) calculating whether or not there is a touch and a touch position.

The touch sensing circuit 10 may be mounted with one or more parts (e.g., integrated circuits) separately from the display driving circuit 5.

Alternatively, all or part of the touch sensing circuit 10 may be integrated with the display driving circuit 5 or an internal circuit of the display driving circuit 5 and be mounted.

For example, the touch driving circuit 11 of the touch sensing circuit 10 and the data driving circuit 6 of the display driving circuit 5 may be mounted at an integrated circuit.

The touch display device 1 may adopt either a mutual capacitive touch sensing method or a self-capacitive touch sensing method as its sensing method.

With the above-described configuration, the touch display device 1 realizes an image display function to display an image and a touch sensing function to sense a user's touch.

Further, in the touch display device 1, in order that an electrode in the display panel 4 functions as a touch electrode, a display period is divided from a touch period.

Figure 2A:
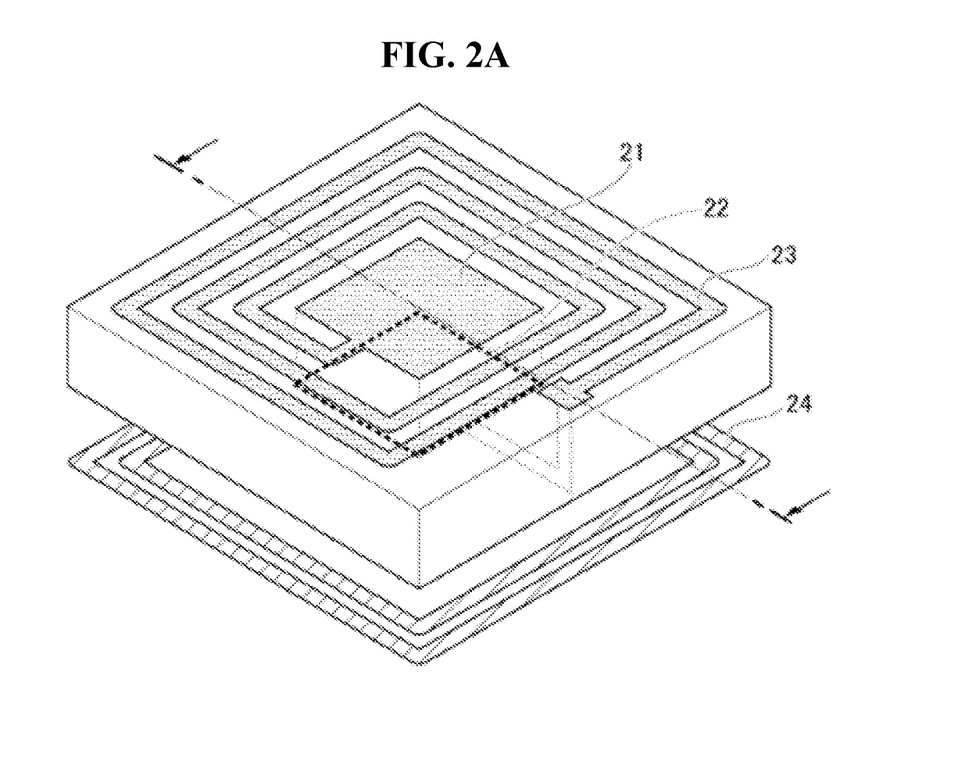
FIG. 2A is a view illustrating a concept of a touch display device according to an aspect of the present disclosure.
Figure 2B:
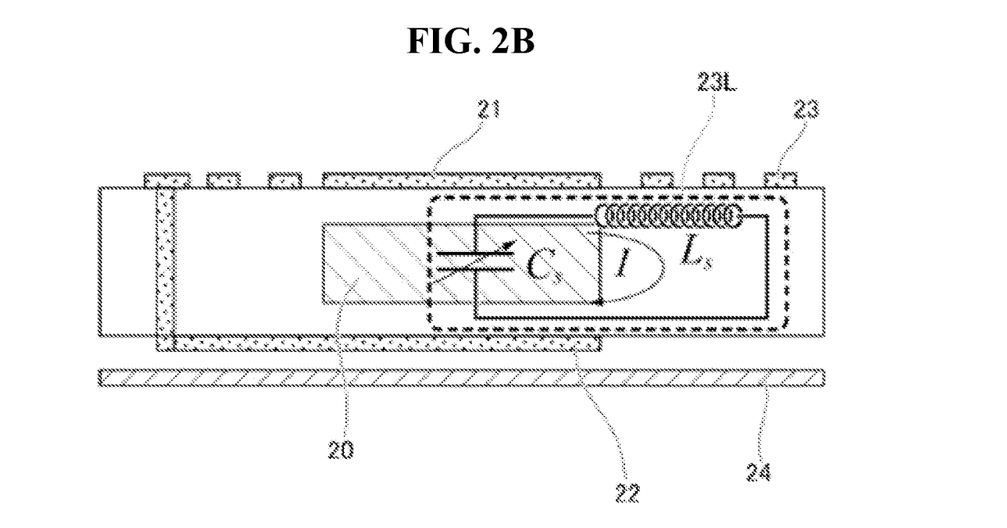
FIG. 2B is a view illustrating a cross-section and a circuit of FIG. 2A.

FIG. 2A is a view illustrating a concept of a touch display device 1 according to an aspect of the present disclosure, and FIG. 2B is a view illustrating a cross-section and a circuit of FIG. 2A.

Referring to FIGS. 2A and 2B, an electrode 21 as a touch electrode, an electrode 22 facing the electrode 21 to form a capacitance 20, a line 23 connected to the electrode 22 and forming a first coil 23L as an inductance Ls, and a line 24 forming a second coil which has a mutual induction (inductive coupling) with the first coil 23L formed by the line 23 are shown.

Figure 3:
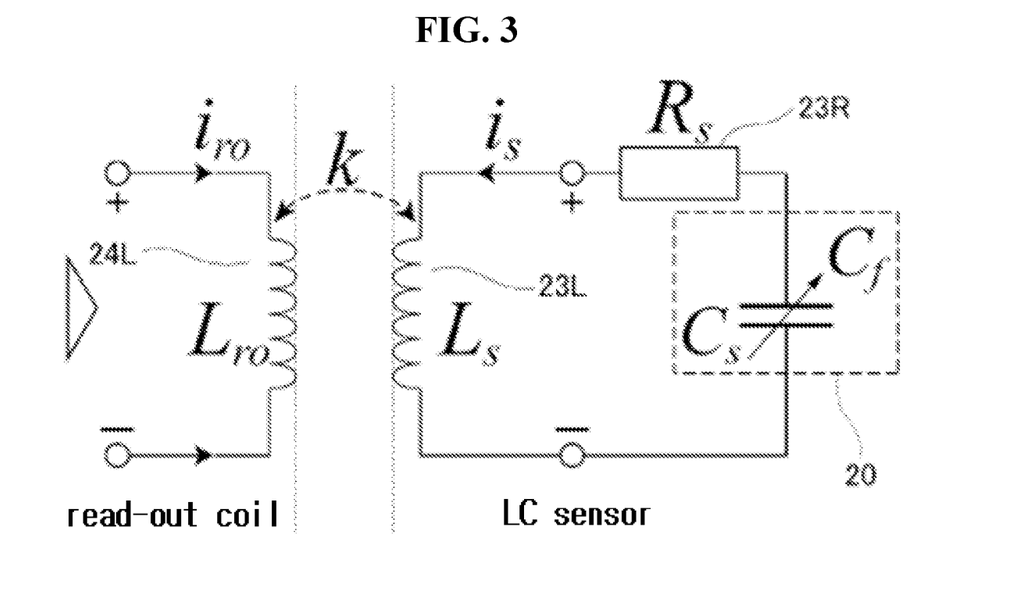
FIG. 3 is an equivalent circuit diagram of FIG. 2.

FIG. 3 is an equivalent circuit diagram of FIGS. 2A and 2B.

In FIG. 3, a capacitance 20, a first coil 23L, a resistor 23R and a second coil 24L are shown.

The resistor 23R is a line resistor of the line 23.

The capacitance 20 and the first coil 23L form an LC sensor.

The second coil 24L having a mutual induction with the first coil 23L is a read-out coil.

When the capacitance 20 formed by the electrode 21 and the electrode 22 changes Cs into Cf, a current flows in the first coil 23L.

A magnetic field is produced at the first coil 23L based on the inductance Ls and the current of the first coil 23L.

A current $i_{ro}$ is generated at the second coil 24L by the mutual induction of the second coil 24L with the first coil 23L based on the inductance $L_{ro}$ of the second coil 24L.

A mutual induction coupling factor of the first coil 23L and the second coil 24L is referred to as k.

Figure 4:
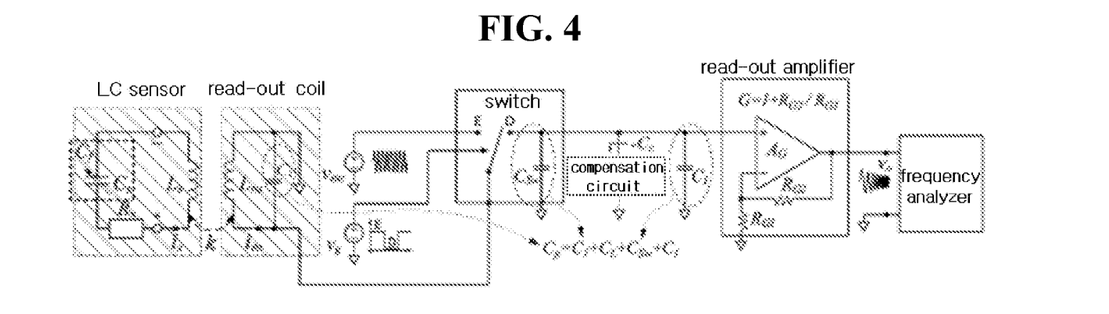
FIG. 4 is a circuit diagram illustrating a read-out circuit of a touch display device according to an aspect of the present disclosure.

FIG. 4 is a circuit diagram illustrating a read-out circuit of a touch display device 1 according to an aspect of the present disclosure.

In FIG. 4, an LC sensor, a read-out coil, a switch, a compensation circuit, a read-out amplifier and a frequency analyzer are shown.

The read-out coil shown in FIG. 4 is the same as the read-out coil shown in FIG. 3.

In the read-out circuit shown in FIG. 4, a read-out is conducted by an analysis of frequency by the frequency analyzer based on a current flowing on the read-out coil.

Figure 5:
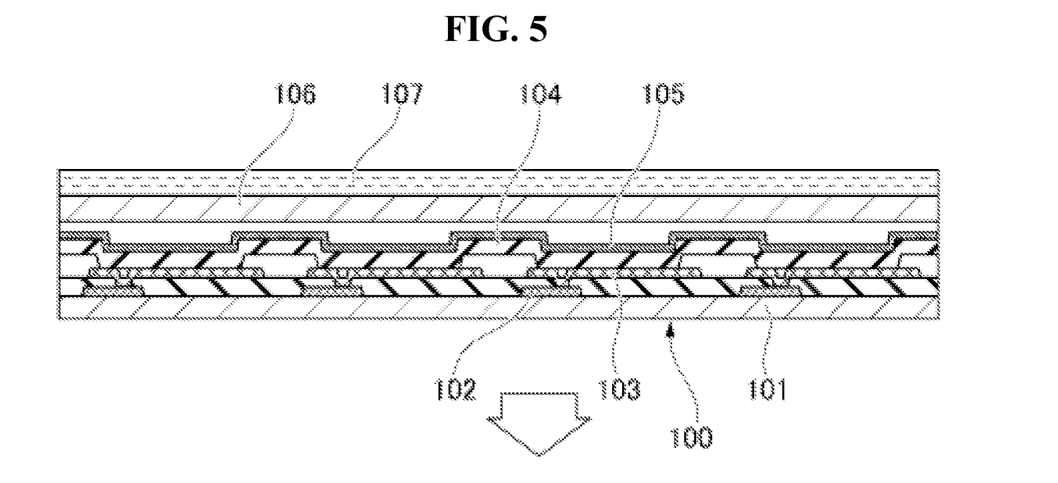
FIG. 5 is a view illustrating a cross-section of a touch display device according to an aspect of the present disclosure.

FIG. 5 is a view illustrating a cross-section of a touch display device 1 according to an aspect of the present disclosure.

In FIG. 5, a substrate 101 including a touch surface 100, an TFT 102, an anode 103, an OLED layer 104, a cathode 105, an encapsulation substrate 106 and a read-out coil 107 are shown.

The substrate 101 is a glass substrate or resin substrate.

The TFT 102 is formed on the substrate 101, and may be a TFT of a bottom gate structure.

The anode 103 is an electrode which is made of a transparent material connected to the TFT 102. The cathode 105 is a common electrode which has a common potential.

The OLED layer 104 is an organic light emitting layer located between the anode 103 and the cathode 105.

The encapsulation layer 106 is a substrate which serves to encapsulate the OLED layer 104 in order for a moisture and the like not to penetrate the OLED layer 104.

The read-out coil 107 may include a line layer and an insulating layer forming the second coil 24L.

Further, the touch display device 1 has a bottom emission structure in which a light is extracted from the substrate 101.

Figure 6:
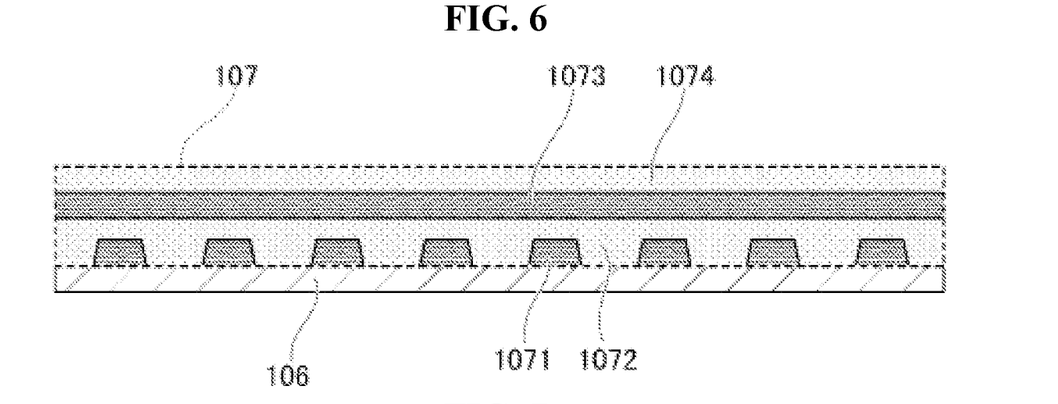
FIG. 6 is a view illustrating a cross-section of a read-out coil formed on an encapsulation substrate of a touch display device according to an aspect of the present disclosure.

FIG. 6 is a view illustrating a cross-section of a read-out coil 107 formed on an encapsulation substrate 106 of a touch display device 1 according to an aspect of the present disclosure.

In FIG. 6, the encapsulation substrate 106 and the read-out coil 107 are shown.

The read-out coil 107 may include a first read-out coil layer 1071, a first insulating layer 1072, a second read-out coil layer 1073 and a second insulating layer 1074.

The first read-out coil (or the first read-out coil layer) 1071 and the second read-out coil (or the second read-out coil layer) 1073 are coils formed of line layers.

The first read-out coil 1071 is formed on the encapsulation substrate 106.

The first insulating layer 1072 is formed to cover the first read-out coil 1071.

The second read-out coil 1073 is formed on the first insulating layer 1072.

The second insulating layer 1074 is formed to cover the second read-out coil 1073.

Figure 7:
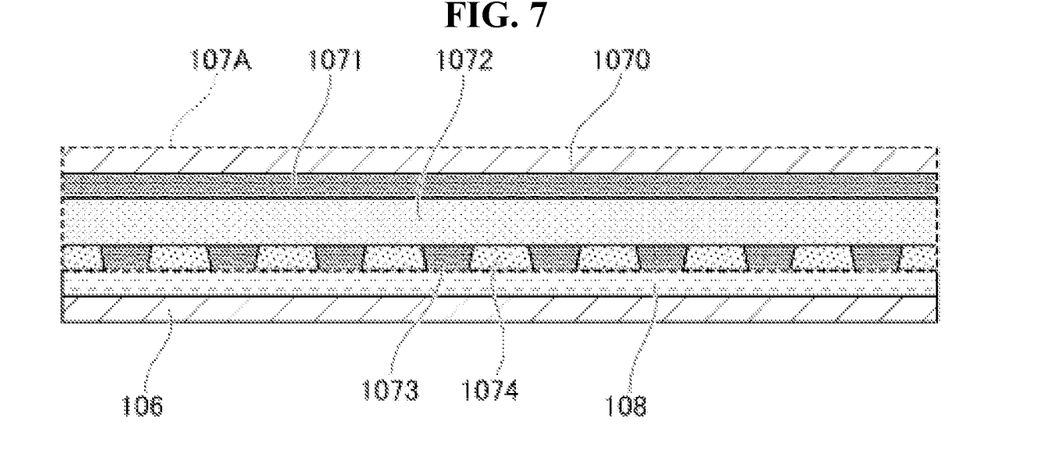
FIG. 7 is a view illustrating a cross-section of a read-out coil attached onto an encapsulation substrate of a touch display device according to an aspect of the present disclosure.

FIG. 7 is a view illustrating a cross-section of a read-out coil 107A attached onto an encapsulation substrate 106 of a touch display device 1 according to an aspect of the present disclosure.

In FIG. 7, the encapsulation substrate 106, and the read-out coil 107A attached to the encapsulation substrate 106 through the adhesive layer 108 are shown.

The read-out coil 107A is configured as the read-out coil 107 is formed on the read-out coil substrate 1070, and the read-out coil 107A has the other components which are equal to those of the read-out coil 107.

Further, in FIG. 7, when the read-out coil substrate 1070 becomes an outer surface of the read-out coil 107A, a bottom surface of the read-out coil 107A is attached to the encapsulation substrate 106 using the adhesive layer 108.

Figure 8:
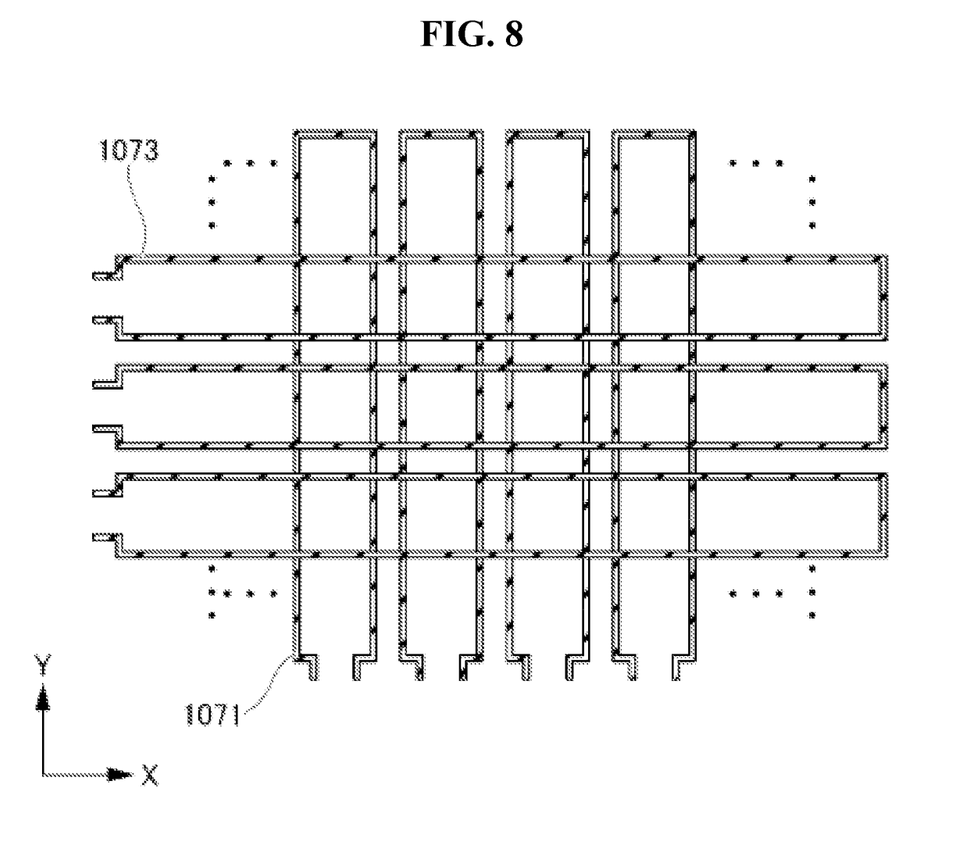
FIG. 8 is a view illustrating a form of a read-out coil in a touch region of a touch display device according to an aspect of the present disclosure.

FIG. 8 is a view illustrating a form of a read-out coil 107 in a touch region of a touch display device according 1 to an aspect of the present disclosure.

In the read-out coil 107, the first read-out coils 1071 extend along a Y direction of the touch region and function as scan signal lines Rx.

The second read-out coils 1073 extend along a X direction of the touch region and function as sensing signal lines Tx.

In a touch driving, a scan signal is input to the first read-out coil 1071, and at the same time, a sensing signal is output from the second read-out coil 1073.

Portions where the first read-out coils 1071 and the second read-out coils 1073 overlaps each other are selected by the scan signals, and are sensed by the sensing signals.

Figure 9:
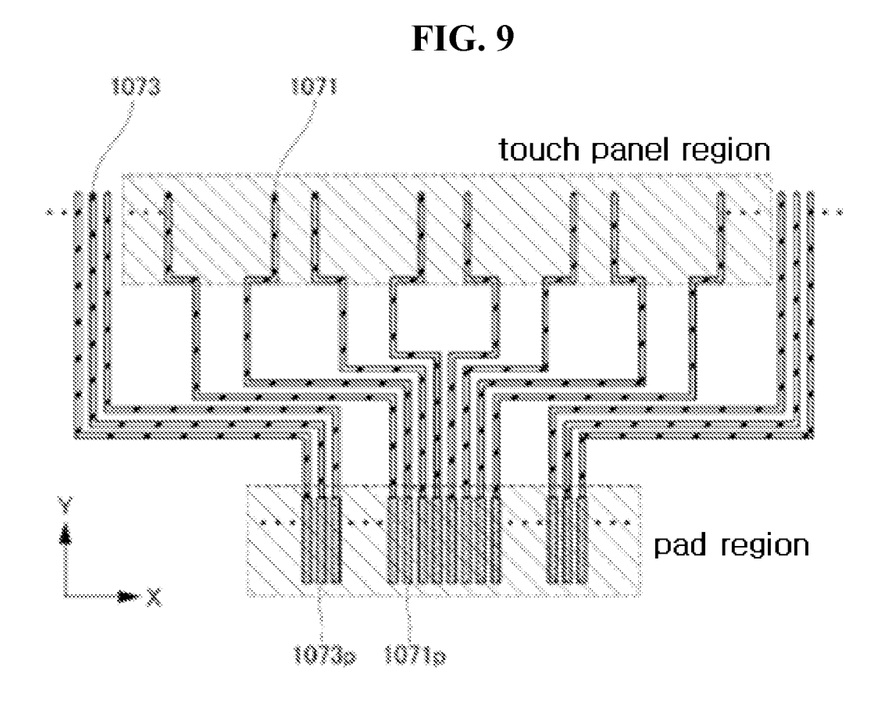
FIG. 9 is a view illustrating read-out coils from a touch region and a pad region of a touch display device according to an aspect of the present disclosure.

FIG. 9 is a view illustrating read-out coils 107 from a touch region and a pad region of a touch display device 1 according to an aspect of the present disclosure.

As shown in FIG. 9, each of the first read-out coils 1071 as scan signal lines is wired from the touch region to the pad region and is connected to each of first terminals 1071p. Each of the second read-out coils 1073 as sensing signal lines is wired from the touch region to the pad region and is connected to each of second terminals 1073p.

In FIG. 9, the first read-out coils 1071 and the second read-out coils 1073 are shown. However, lines of the first read-out coils 1071 and the second read-out coils 1073 are not limited to the form shown in FIG. 9.

Figure 10:
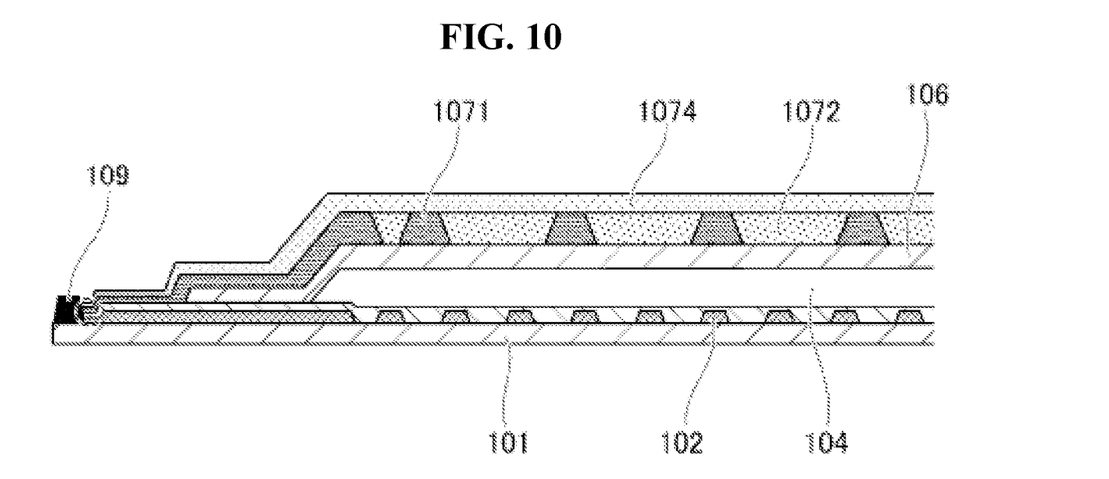
FIG. 10 is a view illustrating a cross-section including a pad portion in an example of adopting a read-out coil shown in FIG. 6.

FIG. 10 is a view illustrating a cross-section including a pad portion in an example of adopting a read-out coil 107 shown in FIG. 6.

In FIG. 10, a first substrate 101, a TFT 102 covered by an insulating layer and connected to an anode, a display layer including anode and cathode not shown and an OLED layer 104, an encapsulation substrate 106, a read-out coil including a first read-out coil layer 1071, a first insulating layer 1072, a second read-out coil layer not shown and a second insulating layer 1074, and an IP (Intellectual Property) core 109 are shown.

The IP core 109 connects the TFT 102 and the first read-out coil layer 1071. However, this is not limited to the connection of the TFT 102 and the first read-out coil layer 1071.

Further, the second read-out coil layer not shown is connected to the TFT 102.

Figure 11:
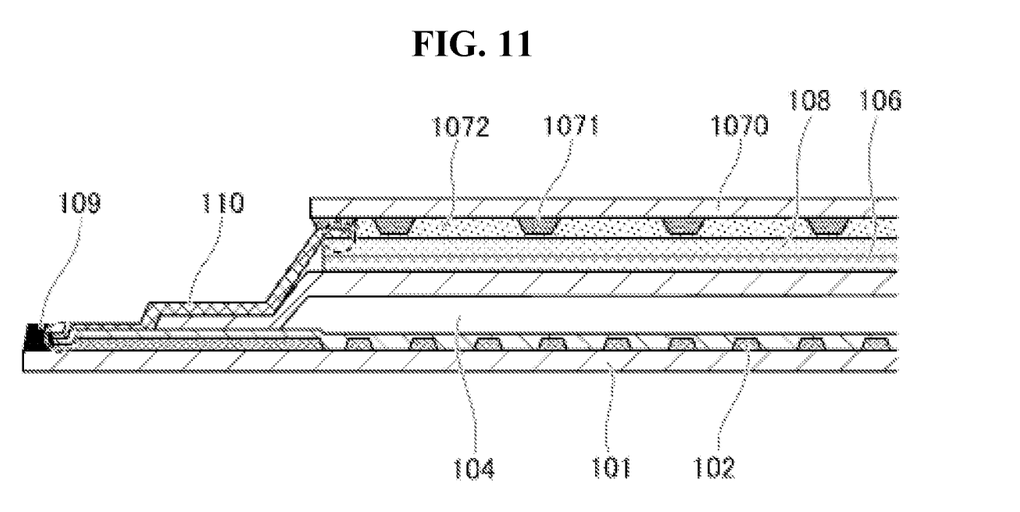
FIG. 11 is a view illustrating a cross-section including a pad portion in an example of adopting a read-out coil shown in FIG. 7.

FIG. 11 is a view illustrating a cross-section including a pad portion in an example of adopting a read-out coil 107A shown in FIG. 7.

In FIG. 11, a first substrate 101, a TFT 102 covered by an insulating layer and connected to an anode, a display layer including anode and cathode not shown and an OLED layer 104, an encapsulation substrate 106, a read-out coil installed on a read-out coil substrate 1070 and including a first read-out coil layer 1071, a first insulating layer 1072, a second read-out coil layer not shown and a second insulating layer 1074, an IP core 109, and an FPC (Flexible Printed Circuits) 110 are shown.

The IP core 109 connects the TFT 102 and the FPC 110. However, this is not limited to the connection of the TFT 102 and the FPC 110.

The FPC 110 is connected to the first read-out coil layer 1071.

Further, the second read-out coil layer not shown is connected to the FPC 110.

As described above, according to the aspects, a technology of a touch display device can be provided which can detect whether or not there is a touch and a touch position through a new method other than the prior art.

In detail, a change of an internal capacitance of a display panel can be detected by a second coil connected to the inside of the display panel.

Because a common electrode shielding an electric field is installed in the display panel, it is difficult to conduct an internal detection of a display panel in the prior art.

However, according to the aspects, a change of a capacitance inside a display panel is detected by a mutual induction of a first coil and a second coil. Accordingly, even though a common electrode is installed, a change of a capacitance inside a display panel can be detected.

Further, according to the aspects, a configuration which is capable of detecting a change of a capacitance inside a display panel can be realized in a small number of processes without complicating manufacturing process.

Further, according to the aspects, a configuration which is capable of detecting a change of a capacitance inside a display panel can be realized without reducing a transmittance and a display quality of a display panel.

Further, in the aspects, an in-cell type touch display device is explained by way of example. However, the present disclosure is not limited to an in-cell type touch display device but may be applied to an on-cell type touch display device and an external type touch display device as well.

Further, in the aspects, an OLED display panel as a display panel is explained by way of example. However, the present disclosure is not limited to an OLED display panel but may adopt a liquid crystal display panel as a display panel and other display panel than a liquid crystal display panel or OLED display panel.

Further, in the aspects, a touch display device detecting multi touches is explained by way of example. However, the present disclosure is not limited to a touch display device detecting multi touches but may be applied to a touch display device detecting a single touch.

In the touch display device detecting multi touches, as described above, a current flows on a first coil, a mutual induction from an electrode of a display element of a display panel to a second coil is formed and a current flows on the second coil, thus a touched finger or the like changes a capacitance of the electrode of the display element of the display panel, and by an amount of this change, an amount of a current of the second coil mutually induced is changed.

In the touch display device detecting multi touches, a current flows from the first coil, and by a change of a current flowing again to the first coil by a mutual induction with the electrode of the display element of the display panel, a touch detection may be performed.

In other words, the first coil and the second coil may be formed of one coil.

According to the present disclosure, a technology of a touch display device can be provided which can detect whether or not there is a touch and a touch position through a new method other than the prior art.

It will be apparent to those skilled in the art that various modifications and variation can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A touch display device comprising:
   a first electrode and a second electrode which are installed inside a display panel and face each other to form a capacitance;
   a first coil installed inside the display panel and connected to the first electrode and the second electrode; and
   a second coil installed inside the display panel and having a mutual induction with the first coil to generate a current in the second coil by the mutual induction,
   wherein the touch display device conducts a touch detection by the generated current,
   wherein when the capacitance is changed, a current flows in the first coil to produce a magnetic field from the first coil, and
   wherein the current of the second coil is generated by the magnetic field from the first coil.

2. The touch display device of claim 1, wherein the first electrode and the second electrode are included in a display element of the display panel.

3. The touch display device of claim 1, wherein the first coil and the second coil are formed of one coil.

4. The touch display device of claim 3, wherein the first coil and the second coil are formed on an encapsulation layer which is disposed in the display panel.

5. The touch display device of claim 3, further comprising an adhesive layer attaching the first coil and the second coil to an encapsulation layer, and
   wherein the encapsulation layer is disposed in the display panel.

6. The touch display device of claim 1, wherein the display panel includes an OLED display panel.

7. The touch display device of claim 6, wherein the display panel is a bottom emission type display panel.

8. The touch display device of claim 1, wherein the display panel includes a liquid crystal display panel.

9. The touch display device of claim 8, wherein the display panel is a bottom emission type display panel.

10. A touch display device including a display panel, comprising:
    a first electrode arranged in the display panel and functioning as a touch electrode;
    a second electrode facing the first electrode and forming a capacitance with the first electrode;
    a first line connected to the second electrode and forming a first coil in which a current flows when the capacitance is formed by the first and second electrodes and generating a magnetic field; and
    a second line forming a second coil that has a mutual induction with the first coil and generating a current by the mutual induction.

11. The touch display device of claim 10, wherein the plurality of touch electrodes are included in a display element of the display panel.

12. The touch display device of claim 10, wherein the first coil and the second coil are formed of a single coil.

13. The touch display device of claim 10, wherein the display panel includes an OLED display panel.

14. The touch display device of claim 13, wherein the display panel is a bottom emission type display panel.

15. The touch display device of claim 10, wherein the display panel includes a liquid crystal display panel.

16. The touch display device of claim 15, wherein the display panel is a bottom emission type display panel.

17. The touch display device of claim 10, further comprising an encapsulation layer encapsulating the first coil and the second coil.

18. The touch display device of claim 17, further comprising an adhesive layer attaching the first coil and the second coil to the encapsulation layer.

* * * * *